United States Patent [19]

Geisey

[11] 4,413,866
[45] Nov. 8, 1983

[54] BEARING ASSEMBLY WITH WEAR PADS

[75] Inventor: James W. Geisey, Kent, Ohio

[73] Assignee: Rotek Incorporated, Aurora, Ohio

[21] Appl. No.: 386,249

[22] Filed: Jun. 8, 1982

[51] Int. Cl.³ .............................................. F16L 33/46
[52] U.S. Cl. .................................................... 308/217
[58] Field of Search ............ 308/201, 202, 203, 207 R, 308/216, 217, 218, 235

[56] References Cited

U.S. PATENT DOCUMENTS

| | | | |
|---|---|---|---|
| 1,068,018 | 7/1913 | Stuebner | 308/213 |
| 2,565,284 | 8/1948 | Trbojevich | 308/202 |
| 2,655,958 | 1/1952 | Waldherr, Jr. | 308/201 |
| 3,022,125 | 1/1960 | Bratt et al. | 308/213 |
| 3,552,814 | 1/1971 | Altson et al. | 308/217 |
| 4,015,884 | 4/1977 | Bertram et al. | 308/216 |
| 4,019,791 | 4/1977 | Loberg | 308/217 |
| 4,280,743 | 7/1981 | Fernlund | 308/217 |

OTHER PUBLICATIONS

Rotek Drawing of Part No. B 71141, 6-8-82.

Rotek, Incorporated Design Guide and Catalog, 1981.

*Primary Examiner*—Stuart S. Levy
*Assistant Examiner*—David J. Werner
*Attorney, Agent, or Firm*—Yount & Tarolli

[57] ABSTRACT

An improved bearing assembly supports a pair of parts for movement relative to each other. The bearing assembly includes a plurality of rotatable bearing elements such as rollers, which engage raceways on the parts. The bearing elements are disposed in openings formed in a longitudinally extending cage member which separates the bearing elements. The cage member is supported by wear pads which engage at least one of the raceways. The bearing elements roll along a central portion of the raceway. Wear pads support the cage member. To minimize scraping or marking of the portion of the raceway engaged by the bearing elements, the wear pads engage opposite sides of the raceway. The wear pads extend through openings formed in the cage and can be readily disconnected from the cage to facilitate replacement.

15 Claims, 7 Drawing Figures

BEARING ASSEMBLY WITH WEAR PADS

BACKGROUND OF THE INVENTION

This invention relates generally to a new and improved bearing assembly having wear pads to maintain a bearing cage in a desired position relative to a raceway.

A known bearing assembly is used to support relatively rotatable parts. This known bearing assembly includes a plurality of rollers which are disposed in a cage. The cage is supported off a raceway by wear pads. The wear pads are welded to and slide along a central annular portion of the raceway to support the cage.

As the wear pads slide along the central portion of the raceway, the wear pads tend to mar or scratch the raceway. Since the rollers engage the same portion of the raceway as the wear pads, the marking of the raceway by the wear pads is detrimental to the operating life of this known bearing assembly. In addition, the wear pads tend to scrape lubricant off of the portion of the raceway engaged by the rollers, thereby impeding proper lubrication of the rollers.

After a bearing assembly has been used for a substantial period of time, the wear pads may need to be replaced. Since the wear pads of this known bearing assembly are welded to the cage, the entire cage and/or bearing assembly must be replaced when the wear pads become worn.

SUMMARY OF THE INVENTION

In accordance with a feature of the present invention, an improved bearing assembly has wear pads which engage a portion of the raceway not engaged by the bearing elements. The rotatable bearing elements, that is, balls or rollers, roll along a central portion of the raceway. The wear pads engage side portions of the raceway. Therefore, any marking of the raceway by the wear pads does not interfere with the smooth rolling engagement of the raceway by the bearing elements.

After the bearing assembly has been used for an extended period of time, the wear pads may require replacement. To facilitate replacement of the wear pads, they are releasably connected with a cage which separates the bearing elements. To releasably mount the wear pads on the cage, the wear pads extend through openings in the cage and grip opposite sides of the cage. The bearing elements are advantageously disposed in the same openings as the wear pads.

Accordingly, it is an object of this invention to provide a new and improved bearing assembly having wear pads which slidably engage a portion of a raceway which is not engaged by rotatable bearing elements.

Another object of this invention is to provide a new and improved bearing assembly having wear pads which are releasably connected with a cage.

BRIEF DESCRIPTION OF THE DRAWINGS

The foregoing and other objects and features of the present invention will become apparent upon a consideration of the following description taken in connection with the accompanying drawings wherein.

DESCRIPTION OF SPECIFIC PREFERRED EMBODIMENTS OF THE INVENTION

Figure 1:
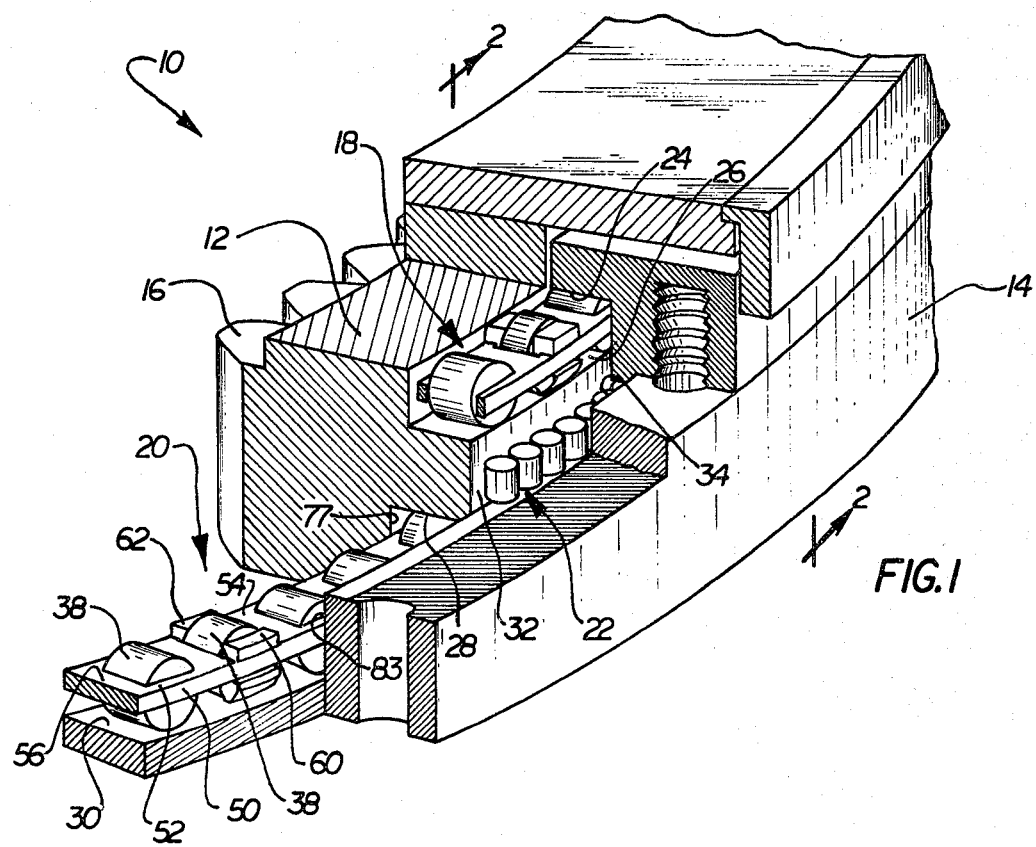
FIG. 1 is a fragmentary sectional view illustrating the relationship between a plurality of bearing assemblies constructed in accordance with the present invention and a pair of relatively movable parts.

A mounting assembly 10 (see FIGS. 1 and 2) includes an annular gear structure or part 12 which is movable relative to an annular support structure or part 14. The gear structure 12 has teeth 16 and is rotatable within the stationary support structure 14. The mounting assembly 10 includes a plurality of bearings disposed between the inner and outer structures 12 and 14. The bearings comprises an upper bearing 18, a lower bearing 20, and a side bearing 22.

Upon relative rotation between the parts 12 and 14, the upper bearing 18 moves along annular upper and lower raceways 24 and 26. The lower bearing 20 moves along annular upper and lower raceways 28 and 30. The side bearing 22 moves along annular inner and outer side raceways 32 and 34. The bearings 18, 20 and 22 and the raceways 24-34 are disposed in a coaxial relationship.

The lower bearing 22 includes a plurality of arcuate bearing assemblies 36 (FIG. 3) disposed in a circular array. Each bearing assembly 36 includes a plurality of rotatable bearing elements 38 which roll along the upper and lower raceways 28 and 30 (FIG. 1) during relative rotation between the inner and outer movable parts 12 and 14. It should be understood that although the illustrated bearing elements are cylindrical rollers 38, it is contemplated that they may be spherical balls instead of rollers.

The bearing assembly 36 (FIG. 3) includes a cage 50 which maintains a desired spacing between the rotatable bearing elements 38. The cage 50 includes longitudinally extending side sections 52 and 54 and connector sections 56 extending between the longitudinally extending side sections 52 and 54. The longitudinally extending side sections 52 and 54, together with the connector sections 56, define openings 58 in which the rotatable bearing elements 38 are disposed. The bearing assembly 36 also includes radially outer and inner wear pads 60 and 62 which support the cage 50 above the lower raceway 30 (FIG. 1).

The upper bearing 18 is constructed with a generally similar structure to that of the lower bearing 22. The upper bearing 18, as well as the lower bearing 20 and the side bearing 22, are shown as being circular bearings. It is to be understood, however, that bearing assemblies constructed in accordance with the present invention are suitable for use in linear as well as circular bearings.

In accordance with a feature of the present invention, the wear pads 60 and 62 slidably engage portions of the lower raceway 30 (FIG. 1) which are not engaged by the rollers 38. Therefore, the rollers 38 do not encounter any marks formed in the raceway 30 by the wear pads 60 and 62. In addition, lubricant is not removed from the path of movement of the rollers by the wear pads 60 and 62.

Figure 4:
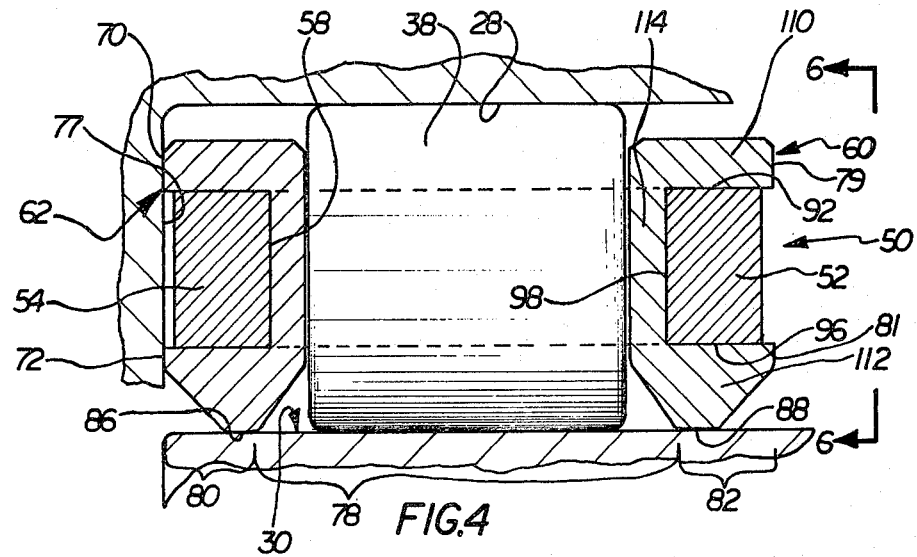
FIG. 4 is an enlarged sectional view depicting the relationship between a rotatable bearing element, a cage, and a pair of wear pads of one of the bearing assemblies.

The lower raceway 30 (FIGS. 4 and 5) has an annular central portion 78 and annular side portions 80 and 82. The roller 38 engages the central portion 78 of the lower raceway 30. The wear pads 60 and 62 slidably engage the side portions 80 and 82 respectively of the lower raceway 30. The wear pad 60 (FIG. 4) has a lower side surface 88 which engages the side portion 82 of the raceway 30. The wear pad 62 has a lower side surface 86 which slidably engages the side portion 80 of the raceway 30.

The rollers 38 do not engage the side portions 80 and 82 of the raceway 30. The rollers 38 roll along the central portion 78 of the raceway 30. Therefore, the wear pads 60 and 62, as they move along the raceway 30, will not mar or scratch the surface of the raceway along which the rollers 38 move. Also, the wear pads 60 and 62 will not scrape lubricant off of the central portion 78 of the raceway.

Figure 3:
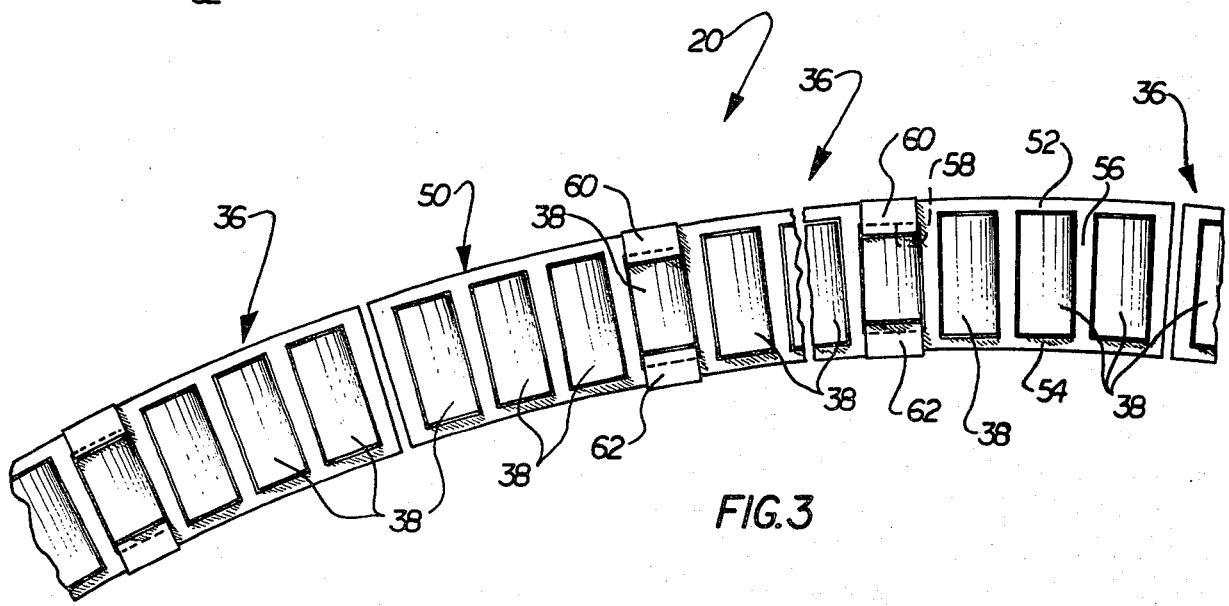
FIG. 3 is a fragmentary plan view of one of the bearing assemblies of FIGS. 1 and 2.
Figure 5:
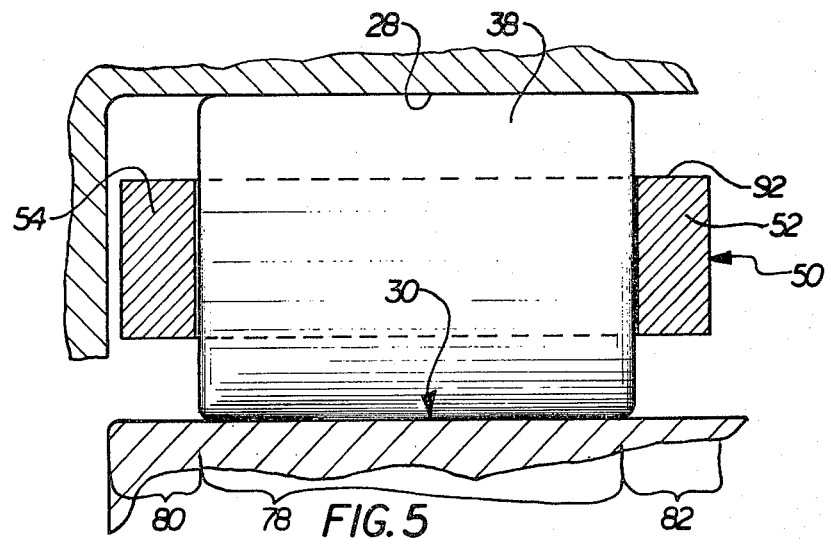
FIG. 5 is a sectional view, generally similar to FIG. 4, and depicting the relationship between the cage and a second bearing element.

The roller 38 between the wear pads 60 and 62 (FIG. 4) has a longer axial extent than the rollers 38 which are not associated with the wear pads (FIGS. 3 and 5). The central portion 78 of the raceway 30 is wide enough to accommodate the relatively large axial extent of the rollers 38 which are not associated with wear pads. It should be understood that there may be a slight overlapping of the rollers 38 which have a large axial extent (FIG. 5) on the side portions 80 and 82 of the raceway.

The wear pads 60 and 62 are advantageously constructed of a material which is softer than the material of the raceway 30. The wear pad material may be bronze, for example, or plastic. This provides for a minimum of interference and scratching of the raceway by the wear pads.

Figure 2:
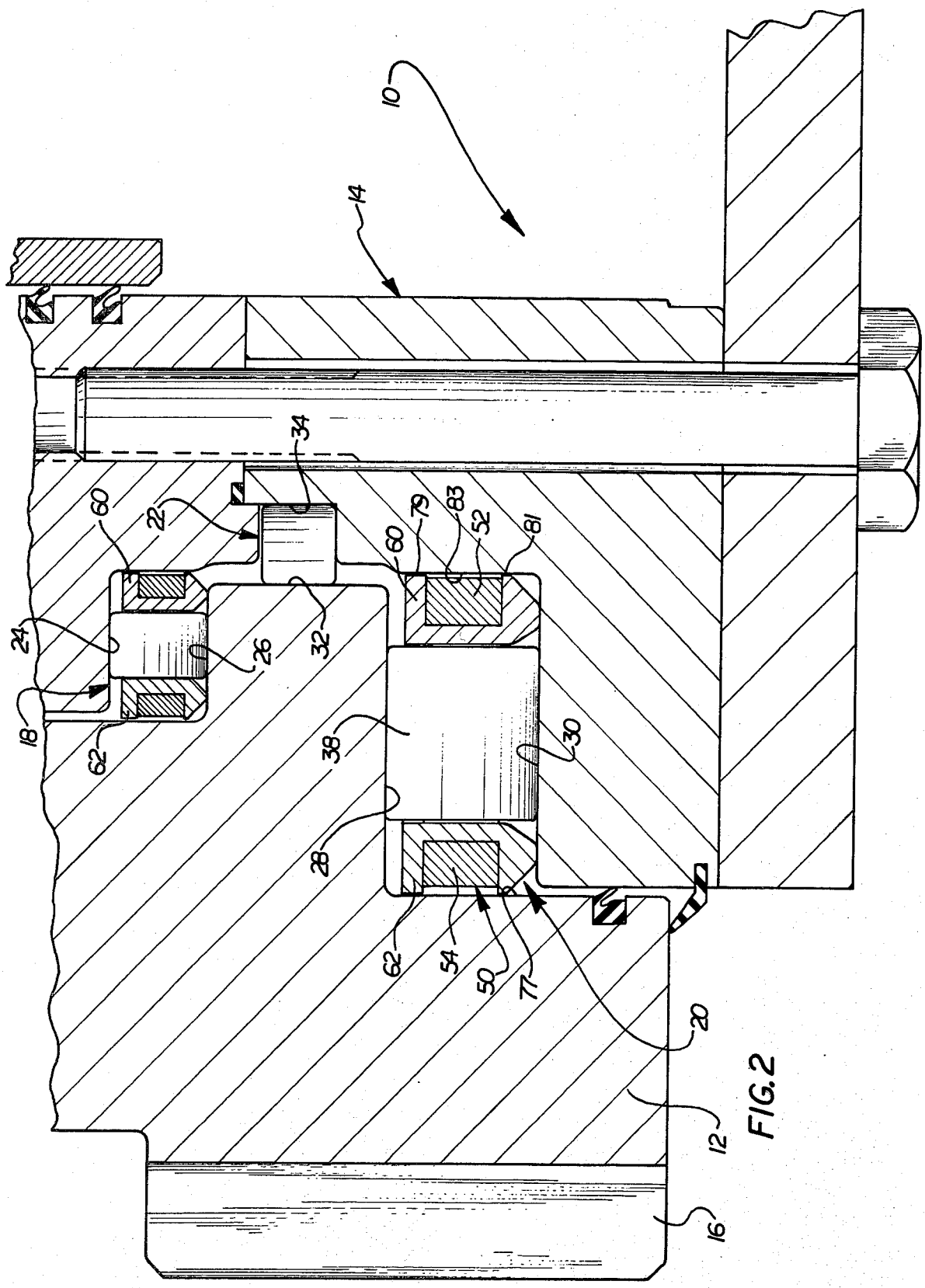
FIG. 2 is an enlarged sectional view, taken generally along the line 2—2 of FIG. 1, and further illustrating the relationship between the bearing assemblies and the movable parts.

In accordance with another feature of the present invention, the wear pads 60 and 62 also position the cage 50 relative to the relatively rotatable structures 12 and 14 (FIG. 1) in a direction transverse to the longitudinal extent of the raceways 28 and 30. The wear pad 62 (FIG. 4) has guide surfaces 70 and 72 disposed radially inwardly of the cage side section 54. The wear pad guide surfaces 70 and 72 slidably engage an annular locating surface 77 on the rotatable part 12. The wear pad guide surfaces 70 and 72 are suitably finished to prevent marring or scratching of the locating surface 77. The cage 50 is thus positioned horizontally and vertically with respect to the raceways 28 and 30 by the wear pad 62. Similarly, the wear pad 60 has guide surfaces 79 and 81 which engage an annular locating surface 83 on the base part 14 (FIGS. 1 and 2).

In accordance with another feature of the invention, the wear pads 60 and 62 are readily releasable from the cage 50. As the wear pads move along the raceways 28 and 30, they will eventually wear at the point of engagement. Accordingly, the present invention provides wear pads 60 and 62 which are releasably connected to the cage 50 to enable them to be replaced with a minimum of cost and effort.

In order to provide releasable wear pads 60 and 62, the wear pads extend through a rectangular opening 58 (FIG. 4) in the cage 50 and grip opposite side sections 52 and 54 of the cage 50. The side section 52 has an upper longitudinally extending surface 92 facing the upper raceway 28, a lower longitudinally extending surface 96 facing the lower raceway 30, and an inner side surface 98. The C-shaped wear pad 60 includes an upper portion 110 abutting the upper surface 92 of the cage side section 52, a lower portion 112 abutting the lower surface 96 of the cage side section 52, and a connector portion 114 extending between the upper portion 110 and the lower portion 112 and abutting the inner side surface 98 of the cage side section 52. The connector portion 114 of the wear pad 60 extends through the opening 58. The C-shaped wear pad 60 thus grips around the cage side section 52 and is readily releasable from the cage 50.

Figure 6:
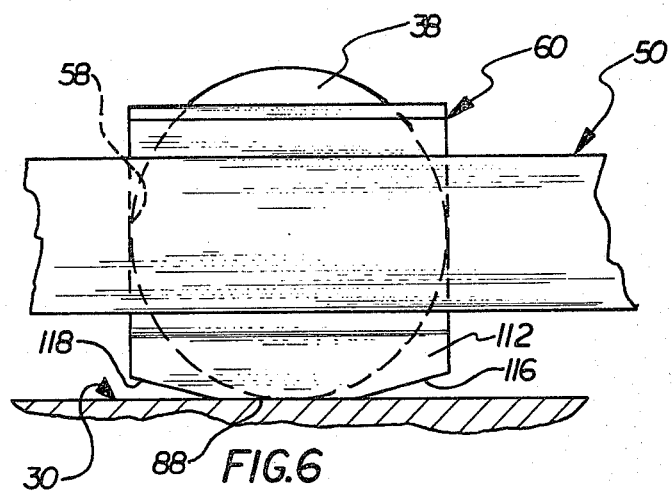
FIG. 6 is a sectional view, taken generally along the line 6—6 of FIG. 4, showing the relationship between the rotatable bearing element, the cage and the wear pad.

The wear pad 60 (FIG. 6) is provided with bevelled edges 116 and 118 on the lower portion 112. This facilitates sliding engagement of the wear pad 60 with the raceway 30. The wear pad 60, which is disposed in the opening 58 with the roller 38, has a longitudinal extent substantially equal to the longitudinal extent of the roller 38.

There are advantageously provided at least two wear pads per side section of each bearing assembly 36. Two wear pads 60 (FIG. 3) grip around the cage side section 52. Two wear pads 62 grip around the cage side section 54. Wear pads 60 and 62 (FIG. 3) may be paired in one opening 58, or may be disposed in different openings 58 along the longitudinal extent of the bearing assembly 36.

It is preferred to place the wear pads relatively near to the end of the bearing assembly 36 to provide a bridge between adjacent bearing assemblies 36. This promotes stability of the bearing 22 as the adjoining bearing assemblies 36 abut each other. The wear pads 60 and 62 are disposed in openings 58 along with bearing elements 38 in order to prevent having a significant length of bearing assembly 36 which is not supported by rollers 38.

Figure 7:
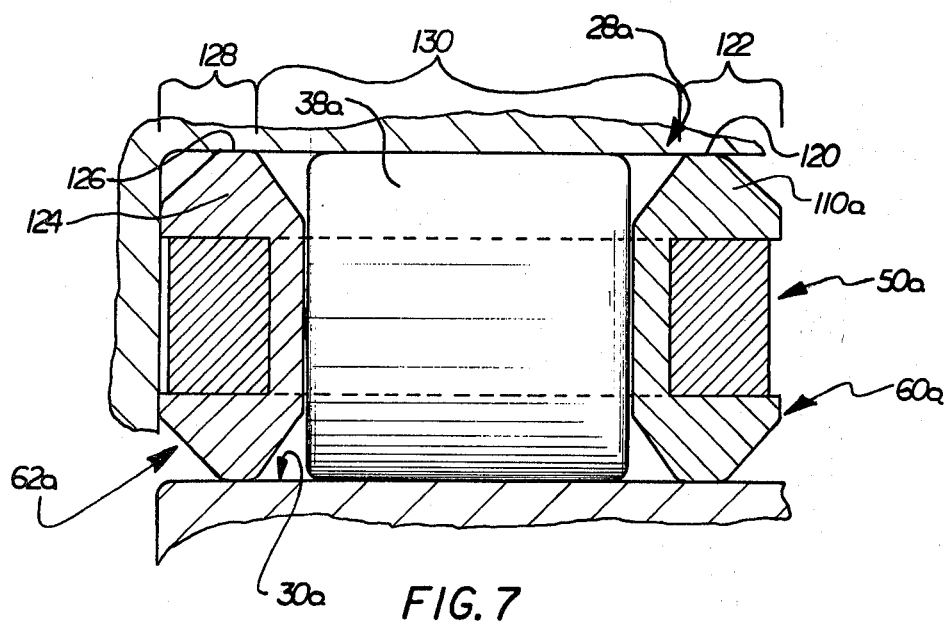
FIG. 7 is a sectional view, generally similar to FIG. 4, of a second embodiment of a bearing assembly in which the wear pads engage a pair of raceways.

In accordance with another feature of the invention, wear pad 60a (FIG. 7) has an upper side surface 120 to position the cage 50a relative to the upper raceway 28a. Reference numerals in FIG. 7 with the letter "a" refer to elements in FIG. 7 which generally correspond to those in FIG. 4. The upper portion 110a of the wear pad 72 has an upper side surface 120 which slidably engages the side portion 122 of the upper raceway 20a. Wear pad 62a has an upper portion 124 with an upper side surface 126 which slidably engages the side portion 128 of the upper raceway 28a. Roller 38a engages the central portion 130 of the upper raceway 28a.

It should be understood that the bearings 18 and 20 (FIGS. 1 and 2) of the present invention may be constructed in accordance with the present invention as single annular assemblies rather than the circular array of bearing assemblies 36 illustrated. Bearing assemblies 36 may also be used in bearings having horizontal rather than vertical axes of rotation. Furthermore, the raceways 24–34 may be formed on elements which are separate from the main annular structures 12 and 14 but attached thereto.

In view of the foregoing description, it is apparent that the present invention provides a new and improved bearing assembly 36 having wear pads 60 and 62 which engage side portions 80 and 82 of a raceway 30 which are not engaged by the bearing elements 38. Therefore, any marking of the raceway 30 by the wear pads 60 and 62 does not interfere with smooth rolling engagement of the raceway by the bearing elements 38.

The present invention also provides wear pads 60 and 62 which may be replaced after the bearing assembly has been used for an extended period of time. The wear pads 60 and 62 are releasably connected with a cage 50 which separates the bearing elements. The wear pads extend through openings 58 in the cage and grip opposite side sections 52 and 54 of the cage. The wear pads 60 and 62 are advantageously disposed in the same openings 58 as the bearing elements.

Specific preferred embodiments having been described, what is claimed is:

1. A bearing assembly for use between first and second relatively movable parts having a first longitudinally extending raceway connected with the first part and a second longitudinally extending raceway connected with the second part, said bearing assembly comprising a plurality of rotatable bearing elements which are movable along the first and second raceways upon relative movement between the first and second parts, said bearing elements having outer surfaces which are adapted to roll along central portions of the first and second raceways during relative movement between the first and second parts, longitudinally extending cage means for maintaining a desired spacing between said bearing elements as they move along the first and second raceways, said cage means includes first and second spaced apart and longitudinally extending side sections, connector sections extending between said first and second longitudinally extending side sections and cooperating with said side sections to at least partially define a plurality of openings in which said bearing elements are disposed, each of said first and second side sections having a first longitudinally extending side surface facing toward the first raceway, a second longitudinally extending side surface facing toward the second raceway, and inner side surfaces extending between said first and second longitudinally extending side surfaces and partially defining the openings in said cage means, and wear pad means for positioning said cage means in a desired position relative to the first and second raceways as said bearing elements move along the first and second raceways, said wear pad means including first surface means for slidably engaging one of the raceways at a location disposed to one side of the central portion of said one raceway and second surface means for slidably engaging the one raceway at a location disposed to a side of the central portion of the one raceway opposite from the one side, said first and second surface means being spaced apart by a distance which is at least substantially as great as the width of the central portion of the one raceway, said central portion of the one raceway being substantially free of sliding engagement with said wear pad means, said wear pad means includes a plurality of wear pad members each of which extends through one of the openings in said cage means, each of said wear pad members is releasably connected with said cage means, each of said wear pad members extends through one of the openings at a location between one of said rotatable bearing elements and an inner side surface of one of said longitudinally extending side sections, each of said wear pad members includes a first portion abutting said first longitudinally extending side surface of said cage means and a second portion abutting said second longitudinally extending side surface of said cage means, said second portion of said wear pad member slidably engaging a side portion of the second raceway at a location disposed to one side of the central portion of the second raceway.

2. A bearing asembly for use between first and second relatively movable parts having a first longitudinally extending raceway connected with the first part and a second longitudinally extending raceway connected with the second part, said bearing assembly comprising a plurality of rotatable bearing elements which are movable along the first and second raceways upon relative movement between the first and second parts, said bearing elements having outer surfaces which are adapted to roll along central portions of the first and second raceways during relative movement between the first and second parts, longitudinally extending cage means for maintaining a desired spacing between said bearing elements as they move along the first and second raceways, and wear pad means for positioning said cage means in a desired position relative to the first and second raceways as said bearing elements move along the first and second raceways, said wear pad means including first surface means for slidably engaging one of the raceways at a location disposed to one side of the central portion of said one raceway and second surface means for slidably engaging the one raceway at a location disposed to a side of the central portion of the one raceway opposite from the one side, said first and second surface means being spaced apart by a distance which is at least substantially as great as the width of the central portion of the one raceway, said central portion of the one raceway being substantially free of sliding engagement with said wear pad means, said wear pad means including at least one wear pad member having a generally C-shaped cross sectional configuration in a plane extending perpendicular to the longitudinal axis of said cage means, said C-shaped wear pad member having first and second leg segments and a connector segment, and wherein a first leg segment of said C-shaped wear pad member includes said first surface means and said connector segment of said C-shaped member extends between said first leg segment and said second leg segment.

3. A bearing assembly as set forth in claim 2 wherein said rotatable bearing elements are rollers.

4. A bearing assembly as set forth in claim 2 wherein said first surface means slidably engages the one of said first and second raceways at a location having an inner edge which is substantially the same as the outer edge of the central portion of the one raceway.

5. A bearing assembly as defined in claim 2 wherein said wear pad means includes third surface means for slidable engaging the other of said first and second raceways at a location disposed to one side of the central portion of said other raceway.

6. A bearing assembly for use between first and second relatively movable parts having a first raceway connected with the first part and a second raceway connected with the second part, said bearing assembly comprising a plurality of rotatable bearing elements which are movable along the first and second raceways upon relative movement between the first and second parts, cage means for maintaining a desired spacing between said bearing elements as they move along the first and second raceways, said cage means including a longitudinally extending side section and a plurality of spaced apart connector sections extending from said side section in a direction transverse to the longitudinal axis of said side section to at least partially define a plurality of openings in which said bearing elements are disposed, said side section having a first longitudinally extending side surface facing toward the first raceway and a second longitudinally extending side surface facing toward the second raceway, and wear pad means extending through one of the openings in said cage means for positioning said cage means relative to the first and second raceways as said bearing elements move along the first and second raceways, said wear pad means including a wear pad member releasably connected with said cage means, said wear pad member extending through the one opening at a location between one of said rotatable bearing elements and said longitudinally extending side section, said wear pad member including a first portion abutting said first longitudinally extending side surface of said cage means and a second portion abutting said second longitudinally extending side surface of said cage means, said second portion of said wear pad member having surface means for slidably engaging the second raceway.

7. A bearing assembly as set forth in claim 6, wherein said surface means slidably engages the second raceway at a location disposed to one side of a central portion of the second raceway, said rotatable bearing elements having outer side surfaces which move along the central portion of the second raceway.

8. A bearing assembly as defined in claim 6, wherein said wear pad means includes a pair of wear pad members extending through the one opening.

9. A bearing assembly as set forth in claim 6 further including second wear pad means extending through a second opening spaced from the one opening.

10. A bearing assembly as set forth in claim 6, wherein a locating surface is disposed on one of said parts and extends transversely to the second raceway, said wear pad member having guide surface means for engaging the locating surface to position said cage means relative to the first and second parts in a direction transverse to the longitudinal extent of the raceways.

11. A bearing assembly as set forth in claim 6, wherein said first portion of said wear pad member has surface means for slidably engaging the first raceway.

12. A bearing assembly as defined in claim 6, wherein said wear pad member includes a connector portion extending between said first and second portions of said wear pad member, said connector portion having a first surface abutting said longitudinally extending side section and a second surface abutting one of said bearing elements.

13. A bearing assembly for use between first and second relatively movable parts having a first raceway connected with the first part and a second raceway connected with the second part, said bearing assembly comprising a plurality of rotatable bearing elements which are movable along the first and second raceways upon relative movement between the first and second parts, cage means for maintaining a desired spacing between said bearing elements as they move along the first and second raceways, said cage means including first and second longitudinally extending side sections and a plurality of spaced apart connector sections extending between said first and second side sections in a direction transverse to the longitudinal axes of said side sections to at least partially define a plurality of openings in which said bearing elements are disposed, said cage means having a first side surface facing toward the first raceway and a second side surface facing toward the second raceway, and releasable wear pad means for positioning said cage means relative to the first and second raceways as said bearing elements move along the first and second raceways, said releasable wear pad means including a plurality of wear pad members formed separately from said cage means and releasably connected with said cage means, each of said wear pad members including a first segment having first side surface means for engaging the first side surface of said cage means, and a second segment with second side surface means for engaging the second side surface of said cage means, each of said wear pad members being movable between an engaged position in which said first side surface means is disposed in abutting engagement with the first side surface of said cage means and in which said second side surface means is disposed in abutting engagement with the second side surface of said cage means and a disengaged position in which said first and second side surface means are spaced from said cage means, said first segment of each of said wear pad members having surface means for slidably engaging the first raceway when said wear pad members are in the engaged position.

14. A bearing assembly as set forth in claim 13 wherein said bearing elements are rollers.

15. A bearing assembly as set forth in claim 13 wherein each of said wear pad members includes a connector segment extending between said first and second segments, said connector segment of each of said wear pad members extending through one of the openings in said cage means when said wear pad members are in the engaged position.

* * * * *